United States Patent
Hebert

(10) Patent No.: US 6,820,420 B2
(45) Date of Patent: Nov. 23, 2004

(54) SOLAR-BASED POWER GENERATING SYSTEM

(75) Inventor: Thomas H. Hebert, Odessa, FL (US)

(73) Assignee: Global Energy Group, Inc., Odessa, FL (US)

( * ) Notice: Subject to any disclaimer, the term of this patent is extended or adjusted under 35 U.S.C. 154(b) by 0 days.

(21) Appl. No.: 10/094,155

(22) Filed: Mar. 8, 2002

(65) Prior Publication Data

US 2002/0129811 A1 Sep. 19, 2002

Related U.S. Application Data

(60) Provisional application No. 60/274,085, filed on Mar. 8, 2001.

(51) Int. Cl.$^7$ ............................................. B60K 16/00
(52) U.S. Cl. ................... 60/641.7; 60/641.11; 62/235.1; 165/45; 415/916
(58) Field of Search .............................. 60/641.7, 641.8, 60/641.11, 641.15; 62/235.1; 165/45; 415/916

(56) References Cited

U.S. PATENT DOCUMENTS

| | | | | |
|---|---|---|---|---|
| 3,937,599 A | | 2/1976 | Thureau et al. ............. 417/389 |
| 4,110,628 A | * | 8/1978 | Paull et al. ................. 60/641.7 |
| 4,209,991 A | * | 7/1980 | Anderson ................... 60/641.7 |
| 4,307,573 A | | 12/1981 | King ............................ 60/669 |
| 4,376,435 A | * | 3/1983 | Pittman ........................ 165/45 |
| 4,622,949 A | | 11/1986 | Yahalom ..................... 126/415 |
| 4,856,281 A | | 8/1989 | Taylor ........................ 60/641.9 |
| 6,494,251 B2 | * | 12/2002 | Kelley ........................... 165/45 |

* cited by examiner

Primary Examiner—Sheldon Richter
(74) Attorney, Agent, or Firm—Holland & Knight LLP

(57) ABSTRACT

A solar-based power generating system including an electrical alternator or generator for generating electrical power in which the alternator or generator is driven by a refrigerant circulating through a closed-loop heat transfer system including an evaporator exposed to solar energy and a condenser disposed within a large heat sink such as a body of water.

9 Claims, 2 Drawing Sheets

SOLAR-BASED POWER GENERATING SYSTEM

CROSS-REFERENCE TO RELATED APPLICATION

This application claims the benefit of provisional patent application entitled "Solar-Based Power Generating System", filed Mar. 8, 2001, Ser. No. 60/274,085, the disclosure of which is hereby incorporated by reference herein.

BACKGROUND OF THE INVENTION

1. Field of the Invention

This invention relates to power generation. More particularly, this invention relates to power generated from solar energy utilizing a closed-loop refrigerant system in which a circulating refrigerant drives an alternator or generator to produce electrical energy.

2. Description of the Background Art

Presently, there exist many types of systems designed to generate electrical power. Most dominant is that of an electrical power plant in which steam is generated to drive one or more generators to produce electrical power. Another system comprises the use of photovoltaic systems in which solar energy is converted into electrical energy. Unfortunately, generating power through the use of steam necessarily involves the combustion of fossil fuels or the utilization of nuclear fuels whereas, the generation of electrical power through photovoltaics has proven to be too costly for large power generating systems. Thus, there presently exist disadvantages associated with these prior art power generating systems.

Therefore, it is an object of this invention to provide an improvement which overcomes the aforementioned inadequacies of the prior art devices and provides an improvement which is a significant contribution to the advancement of the power generation art.

Another object of this invention is to provide a power generation system in which a refrigerant is circulated within a closed-loop thermal transfer system having an evaporator exposed to solar energy and a condenser exposed to a significant heat sink such as a body of water, with the circulating refrigerant driving an alternator or generator to produce electrical power.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a solar-based power generating system including an electrical alternator or generator for generating electrical power in which the alternator or generator is driven by a refrigerant circulating through a closed-loop heat transfer system including an evaporator exposed to solar energy and a condenser disposed within a large heat sink such as a body of water.

Preferably, the refrigerant comprises a fluid having a low boiling point which readily boils to produce a high pressure gas when exposed to solar energy impending upon the evaporator. The high pressure gaseous refrigerant is then employed to drive an alternator or generator that produces electrical power. The gas then flows into the condenser where it is condensed at a low pressure and temperature through the transfer of heat energy into the body of water in which the condenser is situated. The condensed, liquid refrigerant then returns to the evaporator to continuously repeat the thermal transfer cycle. Importantly, it is noted that the body of water provides such a significant heat sink to the to assure that adequate condensing of the refrigerant gas is achieved.

In a preferred embodiment of the invention, the evaporator comprises a solar collector containing the evaporator. A suitable frame is provided for positioning the solar collector with its evaporator in the air, preferably in a position immediately above the condenser positioned within the body of water so as to be shadowed by the evaporator and the portion of the body of water above it, from otherwise being heated by solar energy that would otherwise be incident onto the body of water immediately above the condenser. In this manner, increased efficiency is obtained due to the reduced heating of the body of water proximate to the condenser that would otherwise occur if it was not shadowed by the solar collector above. Further, in a preferred embodiment of the invention, the solar collector may comprise an upper transparent housing having the evaporator positioned therein so as to create a greenhouse effect proximate to the evaporator and thereby minimize heat loss that would otherwise occur due to wind or precipitation.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
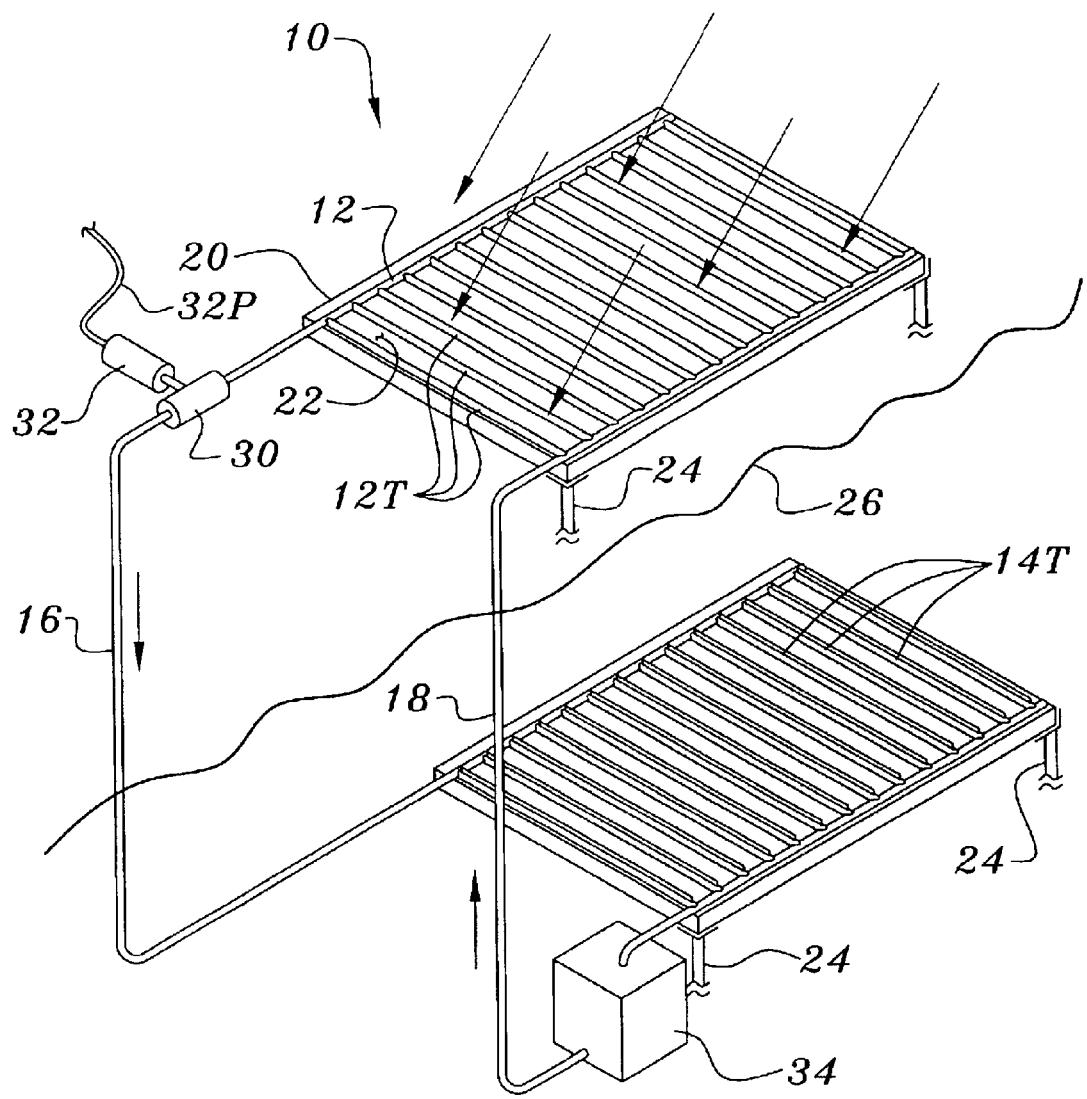
FIG. 1 is a perspective view of the power generating system of the invention.

Referring to FIG. 1, the power generating system 10 of the invention comprises an evaporator 12 and a condenser 14 fluidly connected in a closed-loop by a high pressure conduit 16 and a low pressure conduit 18. The evaporator 12 preferably comprises a plurality of fluid-communicating evaporator tubes 12T arranged in a certain pattern and having appropriate dimensions as may be thermodynamically desired based on the following description of operation. Likewise, condenser 14 preferably comprises a plurality of condenser tubes 14T, with fins, arranged in a certain pattern and having appropriate dimensions as may be thermodynamically desired based on the following description of operation.

The evaporator 12 is preferably positioned within a collector housing 20 whose upper surface comprises a transparent or translucent material 22 to achieve a greenhouse effect about the evaporator 12 positioned therein and thereby minimize undesired heat loss from the evaporator 12 that otherwise would occur by precipitation impinging upon the evaporator 12 or by wind flowing over the surface of the evaporator 12.

The collector housing 20 containing the evaporator 12 is preferably supported by a frame 24 and fixedly oriented in a direction relative to the path of the sun (elevationally and asmythially) to maximize the amount of average solar energy from the sun impinging upon the collector housing 20. It should be appreciated, however, that the collector housing 20 may be mounted onto a gimbal powered by a drive mechanism and controller that tracks the path of the sun so as to always face the collector housing 20 toward the sun to maximize the amount of solar energy impinging upon the collector housing 20 throughout the entire day.

Figure 2:
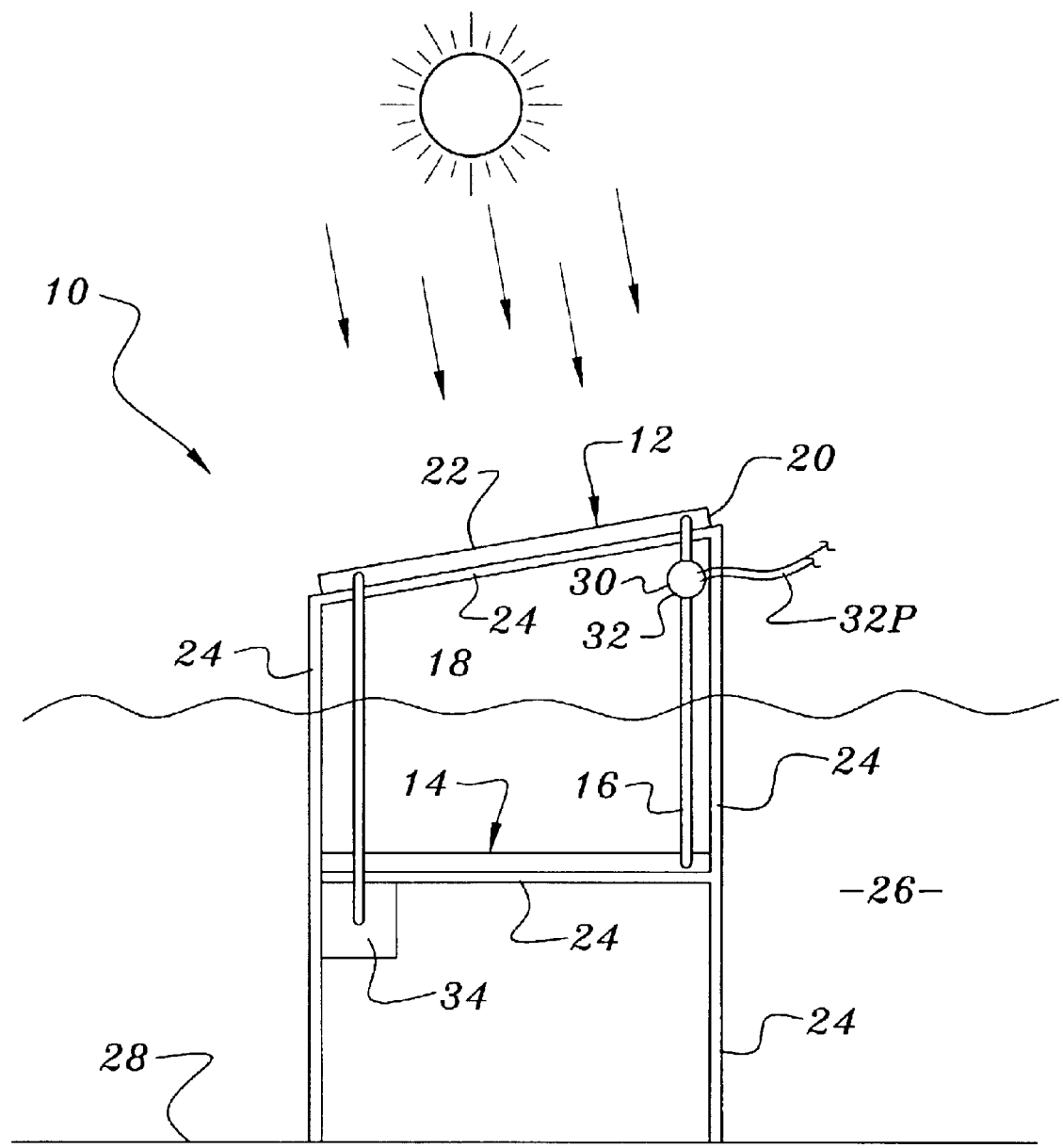
FIG. 2 is an elevational view of the power generating system of the invention.

Referring to FIG. 2, the condenser 14 is preferably likewise mounted to the frame 20 to be supported thereby in a position submerged within a large heat sink such as a body of water 26. Frame 24 may be permanently mounted to the floor 28 of the body of water 26 or may comprise a floating structure that rises and falls with any tidal action so as to assure that the condenser 14 is constantly submerged at a predetermined depth within the body of water 26 irrespective of any tidal action. Finally, it is noted that preferably the frame 24 is configured such that the collector housing containing the evaporator 12 is positioned above the submerged condenser 14 to provide at least some shading to the condenser 14 to reduce the amount of solar heating of the water proximate to the condenser 14 that would otherwise occur without any shading.

For operation, the system 10 is charged with a refrigerant. During operation, the refrigerant contained within the evaporator 12 evaporates or "boils" from a liquid state to a high pressure gaseous state. The high pressure gaseous refrigerant flows from the output of the evaporator 12 through a prime mover 30, such as a turbine, rotary valve or other mechanical device that may be driven by the high pressure gaseous refrigerant. Subsequent to the prime mover 30, the refrigerant flows into the condenser 14 positioned within the body of water and condenses to a liquid state. A refrigerant reservoir 34 may be provided at the output of the condenser 14 to provide for the accumulation of the liquid refrigerant. Liquid refrigerant from the condenser 14 is supplied to the evaporator 12 through the use of an auxiliary refrigerant pump or via capillary feed, to thereby repeat the closed-loop refrigerant cycle. Electrical power is generated by the system 10 of the invention by means of a generator or alternator 32 mechanically coupled to the prime mover 30 and is supplied for use via a power line 32P. Additional electrical power may be attained through the incorporation of photovoltaic cells within the collector housing 20 or as an adjunct thereof.

The operating parameters of the power generating system 10 of the invention envisions the following. The body of water 26 and hence the operating temperature of the condenser 14, is anticipated to be 80 degrees F. The operating temperature of the evaporator 12 is anticipated to be approximately 160 degrees F. on the average through the use of the collector housing 20. Various conventional refrigerants are anticipated to be used, such as R410A, R134A, R407C and R22. For these types of refrigerants, the following operating parameters are anticipated.

At High Temp. (160° F.)
R410A~704 psi
R134A~315 psi
R407C~500 psi
R22~445 psi
$\Delta p$
R410A~454 psi
R134A~214 psi
R407C~500 psi
R22~287 psi
$\Delta h$ Liquid at 80° F. to Gas at 160° F.
R410A~120–40≈70 Btu/lb
R134A~130–40≈80 Btu/lb
R407C~130–40≈80 Btu/lb
R22~120–35 85≈Btu/lb
At Low Temperature 80° F.
R410A~250 psi
R134A~101 psi
R407C~170 psi
R22~158 psi The power generating system 10 of the invention operates during daylight hours to generate electrical energy from solar energy without the disadvantages associated with conventional power generation plants that utilize fossil or nuclear fuels. Hence, significant advantages are achieved.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A power generating system, comprising
an evaporator; and a condenser fluidly connected in a closed-loop by a high pressure conduit and a low pressure conduit for supporting said evaporator in a position exposed to solar enegy and for supporting said condenser in a large heat sink, said large heat sink comprising a body of water, said evaporator being positioned above said condenser to provide at least some shading to said condenser.

2. A power generating system, comprising an evaporator; and a condenser fluidly connected in a closed-loop by a high pressure conduit and a low pressure conduit for supporting said evaporator in a position exposed to solar energy and for supporting said condenser in a large heat sink, said large heat sink comprising a body of water, said condenser comprising a plurality of fluid-communicating condenser tubes arranged in a pattern and having appropriate dimensions to therodynamically optimize the exchange of heat between said refrigerant and said body.

3. A power generating system, comprising an evaporator; and a condenser fluidly connected in a closed-loop by a high pressure conduit and a low pressure conduit for supporting said evaporator in a position exposed to solar energy and for supporting said condenser in a large heat sink, said large heat sink comprising a body of water, said evaporator comprising a pluralty of evaporator tubes arranged in a pattern and having appropriate dimensions to thermodynamically optimize the absorption of solar energy into said refrigerant.

4. A power generating system, comprising an evaporator; and a condenser fluidly connected in a closed-loop by a high pressure conduit and a low pressure conduit for supporting said evaporator in a position exposed to solar energy and for supporting said condenser in a large heat sink, said large heat sink comprising a body of water, said evaporator being positioned within a collector housing whose upper surface comprises a transparent or translucent material to acheive a greenhouse effect about said evaporator and thereby minimize undesired heat loss from said evaporator.

5. A method for electrical power generation, comprising the steps of: employing solar energy to evaporate a refrigerant from a liquid state to a high pressure gaseous state, flowing the high pressure gaseous refrigerant through a prime mover operatively connected to an electrical power generator to generate electrical power, employing large heat sink to condense the refrigerant to a liquid state, said large heat sink comprising a body of water, and shadowing a portion of the body of water that is utilized to condense the refrigerant.

6. A method for electrical power generation, comprising the steps of: connecting an evaporator and a condenser fully in a closed-loop by a high pressure conduit and a low pressure conduit for supporting said evaporator in a position exposed to solar energy and for supporting said condenser in a large heat sink composed of a body of water and positioning the evaporator above said condenser to provide at least some shading to said condenser.

7. A method for electrical power generation, comprising the steps of: connecting an evaporator and a condenser fully in a closed-loop by a high pressure conduit and a low pressure conduit for supporting said evaporator in a position exposed to solar energy and for supporting said condenser in a large heat sink composed of a body of water and thermodynamically optimizing the exchange of heat between said refrigerant in said condenser and said body of water.

8. A method for electrical power generation, comprising the steps of: connecting an evaporator and a condenser fully in a closed-loop by a high pressure conduit and a low pressure conduit for supporting said evaporator in a position exposed to solar energy and for supporting said condenser in a large heat sink composed of a body of water and thermodynamically optimizing the absorption of solar energy into said refrigerant in said evaporator.

9. A method for electrical power generation, comprising the steps of: connecting an evaporator and a condenser fully in a closed-loop by a high pressure conduit and a low pressure conduit for supporting said evaporator in a position exposed to solar energy and for supporting said condenser in a large heat sink composed of a body of water and positionaing a collector housing whose upper surface comprises a transparent or translucent material to acheive a greenhouse effect about said evaporator thereby minimizing undesired heat loss from said evaporator.

* * * * *